United States Patent [19]
Sumi et al.

[11] Patent Number: 5,887,083
[45] Date of Patent: Mar. 23, 1999

[54] METHOD OF PROCESSING IMAGE INFORMATION BASED ON OBJECT MODEL

[75] Inventors: Yasushi Sumi; Fumiaki Tomita, both of Tsukuba; Yutaka Ishiyama, Yokohama, all of Japan

[73] Assignee: Jiro Hiraishi, President of Kogyogijutsuin Stanley Electric Co., Ltd., Japan

[21] Appl. No.: 683,710

[22] Filed: Jul. 18, 1996

[30] Foreign Application Priority Data

Jul. 19, 1995 [JP] Japan .................................. 7-182796

[51] Int. Cl.⁶ .............................. G06K 9/00; G06K 9/48; G06T 17/10
[52] U.S. Cl. ........................... 382/199; 382/154; 345/420
[58] Field of Search ..................... 382/151–154, 382/193, 199, 201, 203, 206, 216, 285; 345/419, 426, 420, 430, 139

[56] References Cited

FOREIGN PATENT DOCUMENTS 04130586  5/1992  Japan ............................... G06T 7/00

OTHER PUBLICATIONS

"Qualitative and quantitive matching of solid models and images of 3D objects," Masahiko Koizumi et al., 9th International Conf. on Pattern Recognition, IEEE comput. Soc. Press, vol. pp. 681–684, 1988.

*Primary Examiner*—David K. Moore
*Assistant Examiner*—Wenpeng Chen
*Attorney, Agent, or Firm*—Gifford, Krass, Groh, Sprinkle, Anderson & Citowski, P.C.

[57] ABSTRACT

A method of processing image information is disclosed, for recognizing the position and attitude of an object with a high speed treatment and improved recognition accuracy. The method comprised of the steps of entry of a stereoscopic image of an object, extraction of edges of the object, and dividing it into segments based on the local feature of the image, adding the apex information to the segments to produce the recognition data, verifying the recognition data with reference to an object model based on local geometric features to detect a corresponding candidate; finely adjusting each of corresponding candidates based on an entire geometric features; and detecting the position and attitude of the object on the basis of recognition including the initial verification and the fine adjustment.

2 Claims, 7 Drawing Sheets

● SAMPLE POINT
▨ DATA POINT
■ CORRELATED POINT

METHOD OF PROCESSING IMAGE INFORMATION BASED ON OBJECT MODEL

BACKGROUND OF THE INVENTION

1. Field of the Invention

The present invention relates to a method of processing image information for verifying an applied image with an object model to determine the position and attitude of the object.

2. Brief Description of the Prior Art

Conventionally, in recognizing the position and attitude of an object, a passive image pickup device is used as the sensor to obtain the image of the object. Then, the two-dimensional features are extracted from the received image, and, by verifying it with the object model, the position and attitude are determined.

In the conventional method of image processing, in which the position and attitude of the object is determined from the received image, the searching space was inevitably enlarged, requiring the large system scheme, and accordingly the high speed processing was impossible.

In other words, in order to define the position and attitude of an object on the basis of an intermediate two-dimensional picture image, it is necessary to correlate at least three characteristic points of the object model. For the purpose, in the case of handling a complicated scene, there is possibility of enlarging the searching space which is provided for verification.

SUMMARY OF THE INVENTION

In view of the disadvantages mentioned above, an object of the present invention is to provide a method of processing an image information with a simplified system scheme, capable of high speed processing, and with improved recognition accuracy.

According to the method of the invention, in which the received image is verified with the object model to determine the position and attitude of the object, wherein a stereoscopic image of an object is received, edges of the object is extracted from the stereoscopic image above, based on the local features of which edges each edge is divided into a plurality of segments, to each of which segments is added an apex information to produce the recognition data, and an initial verification is performed between the recognition data and the object model using local geometric features, thereby detecting a corresponding candidate. In addition, each of corresponding candidates is finely adjusted by applying the entire geometric features, and, accordingly, on the basis of such recognition process including the initial verification together with the fine adjustment mentioned above, the position and attitude of the object is completely detected.

More precisely, the fine adjustment mentioned above for recognition process includes the step of the initial fine adjustment by merely sample points along every adjacent two segments, and also includes the step of principal fine adjustments by entire sample points.

DETAILED DESCRIPTION OF THE PREFERRED EMBODIMENTS

Figure 1:
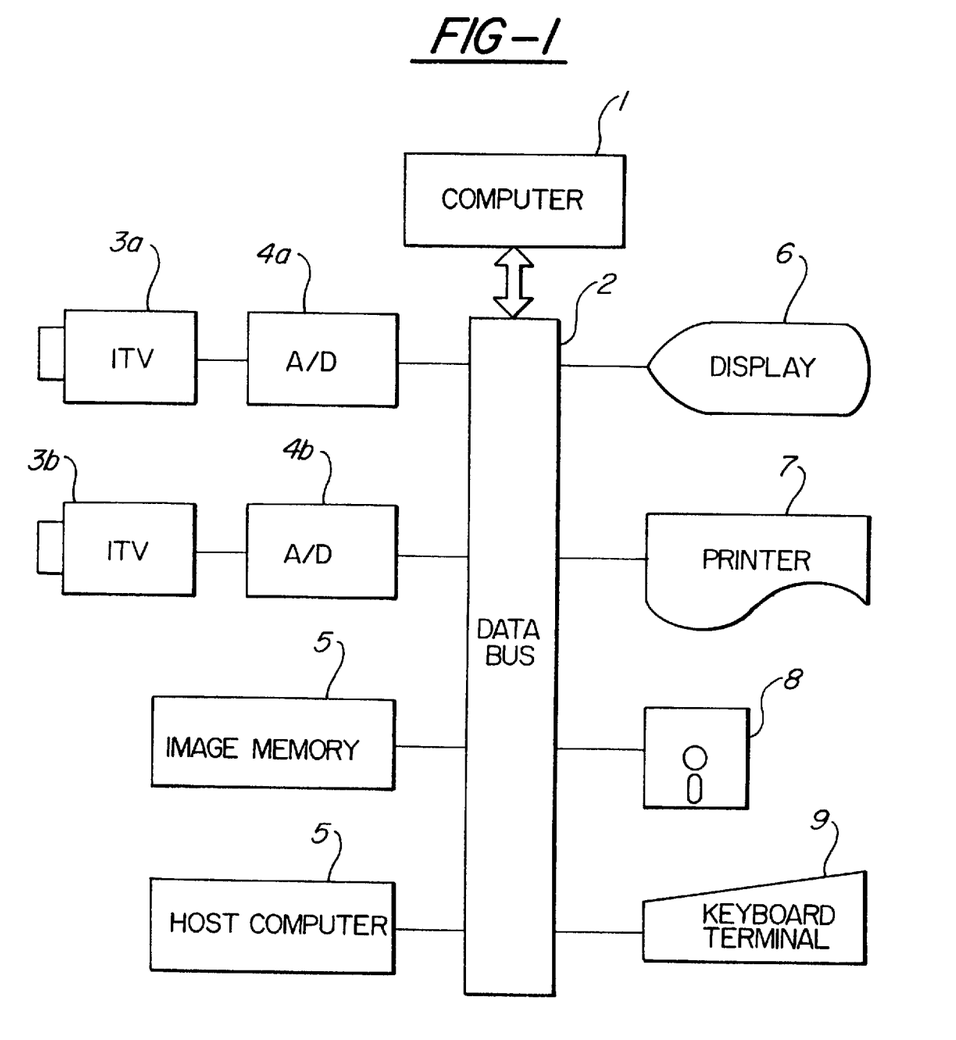
FIG. 1 is a block diagram illustrating a system structure according to an embodiment of the invention.

With reference to the drawings, FIG. 1 shows the system scheme for realizing a method of processing the image information, in which a computer 1 for controlling the entire system is connected via a data bus 2 to each of other components.

Analog output signals from television cameras 3a and 3b are converted to digital signals in A/D converters 4a and 4b and transmitted through a data bus 2. An image memory 5 stores image data of an object taken by television cameras 3a and 3b, and the other components include a display 6 for displaying images, a printer 7, a floppy disk 8 for data storage, and a keyboard terminal 9, and further the system is connected to an external host computer.

Figure 2:
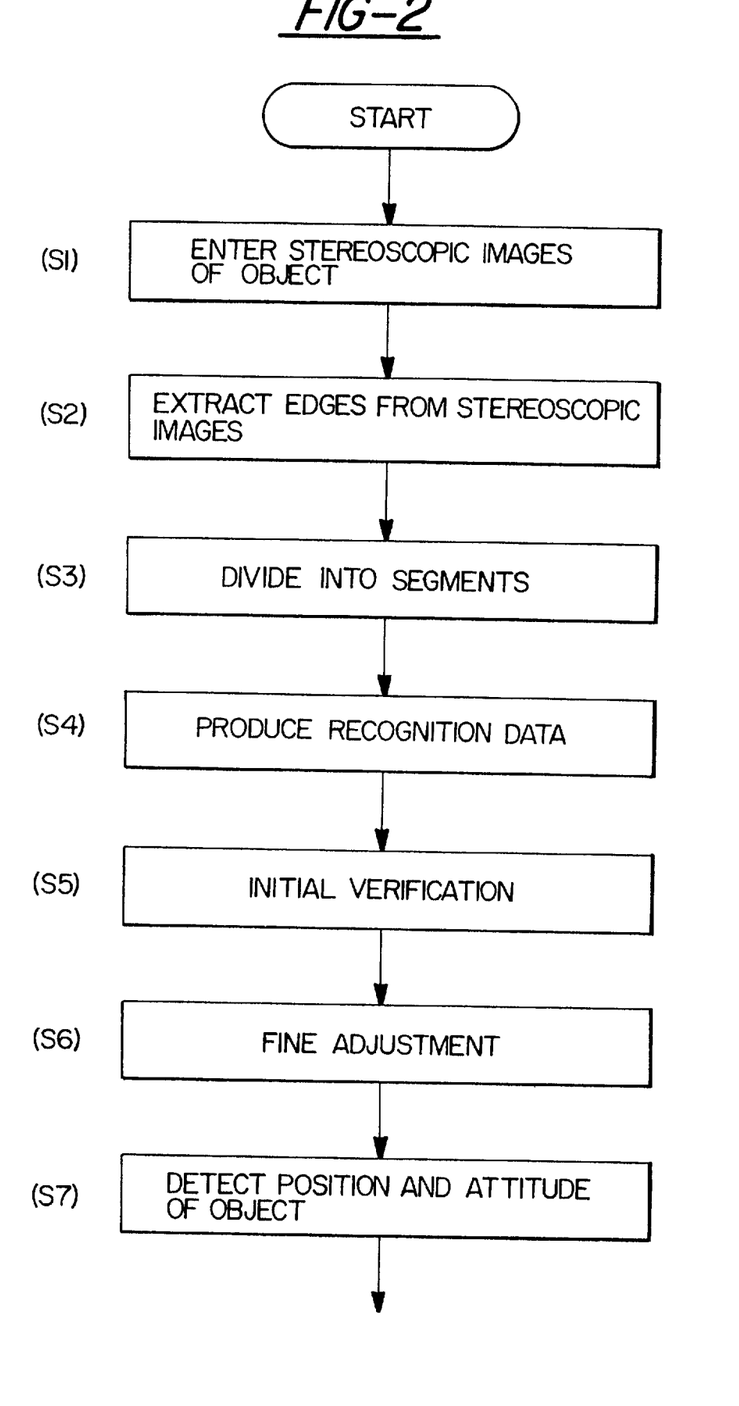
FIG. 2 is a flow chart showing the fundamental treatment of the invention.

A flow chart of FIG. 2 illustrates a flow of fundamental treatments of the invention, the purpose of which flow is to verify the received image with the object model to determine the position and attitude of the object.

The Step S1 enters a stereoscopic image of the object; Step S2 extracts the edges of the object from the stereoscopic image; and Step S3 divides the edges into segments. Subsequently, Step S4 produces recognition data by adding the apex information to the segments; Step S5 performs initial verification of the recognition data with the object model by applying local geometric features to detect the corresponding candidates; then Step S6 finely adjusts each of corresponding candidates by applying entire geometric features; and finally Step S7 detects the position and attitude of the object through the recognition operation including the initial verification and the principal fine adjustment.

The image processing of the invention is more specifically described with reference to FIGS. 3 to 13. From the stereoscopic image in FIG. 3, comprising 640×480 pixels and 256 gray-levels, entered from the system, first the edge lines are extracted, divided with reference to characteristic points (such as branches, inflections, or indentations) to be converted to segments. Then the segmentalized results are retained in a boundary representation (referred to as "B-REP" hereinafter) data structure. This is of a graphic structure comprising elements, in which "regions", "boundaries", "segments" and "points" are related with each other as its elements, and is represented in a topological form.

Figure 4:
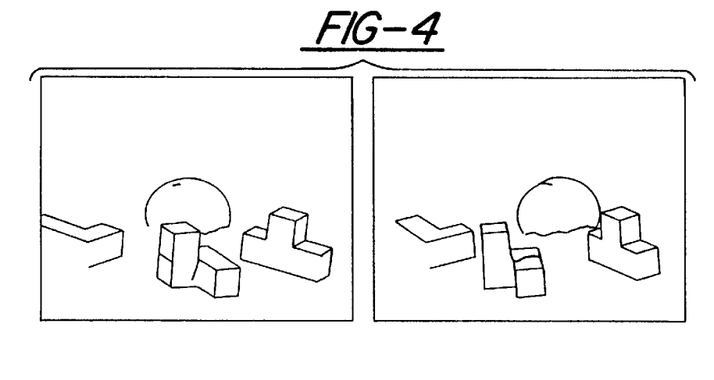
FIG. 4 is a boundary representation of stereoscopic images of FIG. 3.
Figure 5:
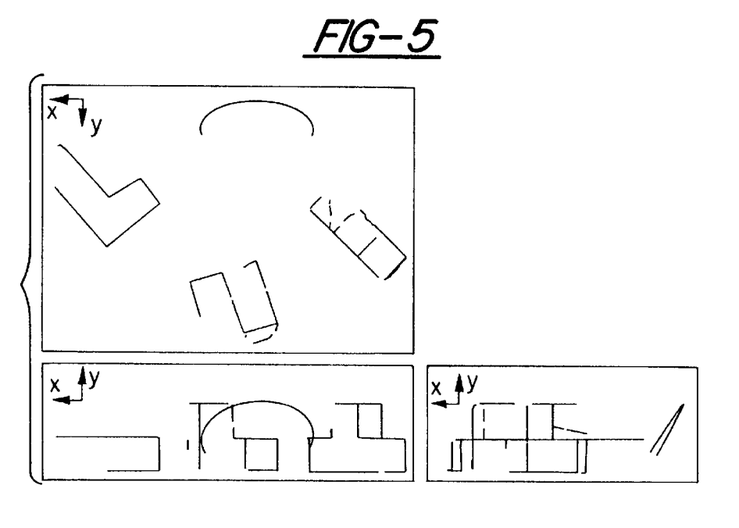
FIG. 5 a three-dimensional information of an object.

FIG. 4 shows a point array of B-REP (abbreviation of "boundary representing"), and FIG. 5 shows a three-dimensional information, in which the segments are obtained from B-REP of the left and right images as a correlated unit of stereoscopic viewing.

Figure 6:
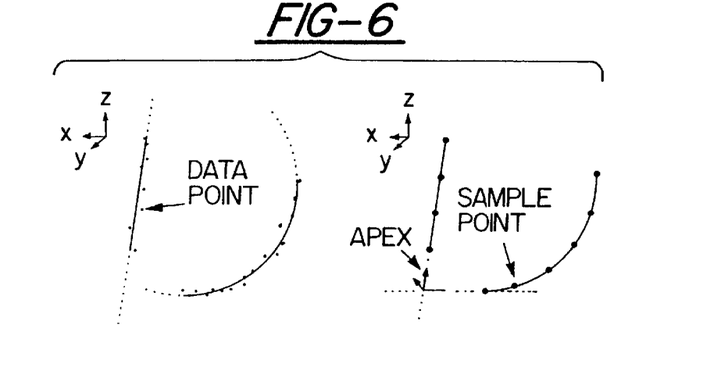
FIG. 6 is an illustrative view of three-dimensional data array of segments.

Next, by adding "apex" which serves as one of the geometric characters for verification, the recognition data is produced. Such an apex is composed of a three-dimensional coordinates and two three-dimensional direction vectors, and can define the position and attitude of an object model existing in the three-dimensional space. Such an apex is produced through the procedures including the following (1) to (4):

(1) As shown in FIG. 6, straight lines or circles are applied and fitted into the three-dimensional data arrays;

(2) In the case that the error is great when straight lines and circles are fitted, the segment is divided into two portions and is tried to fit in regression manner. In other words, each segment is described in approximate form as represented by segments of straight lines or arcs of circles or combination thereof;

(3) To obtain
  (a) a straight line, which belongs to the same boundary of the image B-REP, and is also fitted the two to adjacent segments, or
  (b) a tangential line at the end of an arc of a circle, which also belongs to the same boundary of the image B-REP, and is also fitted to the two adjacent segments; and (4) To produce an apex having each vector of the tangential lines by allocating the apex to a middle point of a line segment which defines a minimum distance between two tangential lines.

With regard to FIG. 6, the figures shown appear two-dimensional due to the nature of the drawing. However, in reality lines which appear to be tangential are actually located separately in the true three-dimensional coordinates. As a result, two orthogonal lines automatically define a line segment between the two lines which mathematically represents the minimum distance between the two orthogonal lines. As there is no intersection between the tangential lines, an apex having vectors of the tangential lines is allocated to a middle point of the line segment representing the minimum distance between the tangential lines in order to produce the recognition data required.

Figure 7:
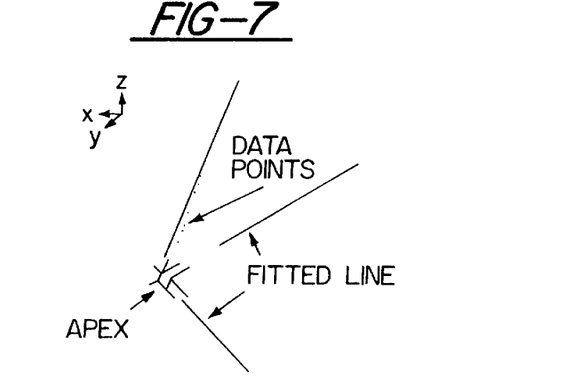
FIG. 7 is an illustrative view of recognition data produced from the three-dimensional information of the object.

FIG. 7 is an enlarged view of part of recognition data produced from the three-dimensional B-REP of FIG. 5. There are represented the three-dimensional B-REP point array, straight lines fitted to such point array, and the apex formed by the adjacent straight lines.

The object model is fundamentally composed of the same data structure as the above-mentioned recognition data, but, as shown in FIG. 6, as the geometric feature necessary for fine adjustment of recognition process, such an object model has sample points on each segment with an equal space therebetween. These sample points each has, as necessary information, the three-dimensional coordinates and a perpendicular defined by the circle fitted to the segment or by the apex which is formed by the segment.

Verification between the produced recognition data and the object model is performed through the following procedure:

The three-dimensional coordinate system $x=[xyz1]^t$ is transformed to $x'=Tx$ by means of 4×4 matrix, that is: formula 1:

$$T = \begin{vmatrix} R & t \\ 0001 & \end{vmatrix} \quad (1)$$

where R is 3×3 rotational matrix, and t is 3×1 parallel displacement vector.

Then, the three-dimensional position and attitude of an object are represented by the coordinate transforming matrix T which displaces the coordinate system of the object model so as to coincide with the corresponding three-dimensional structure in the recognition data. In other words, the recognition process is a process including verification of the object model with reference to the recognition data to calculate the coordinate transforming matrix T.

The above-mentioned recognition process is composed of two steps including "initial verification" for producing candidates which are suitable for correlating the model with the data by utilizing the local geometric features, and "fine adjustment" for verifying each correlated candidate to improve and enhance accuracy of such correlation by utilizing the entire geometric information.

Figure 8:
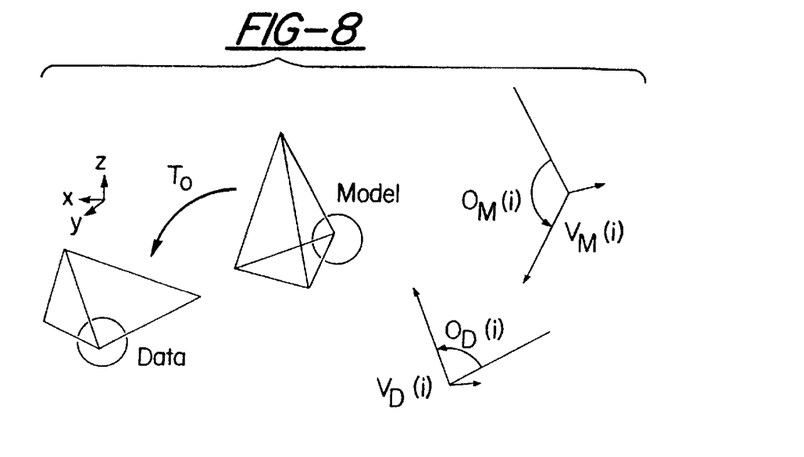
FIG. 8 is an illustrative view representing a step of apex verification of an object model with reference to recongnition data.

First, in the step of initial verification, as shown in FIG. 8, by verifying the apex of the object model with reference to that of the recognition data, the coordinate transforming matrix T is calculated. However, since it is impossible to find a correct correlation of the apex of the model with that of the recognition data in advance, all combinations of the possible apices are selected as correlated candidates.

Further, it is considered to displace the model apex $V_M$ so as to coincide with the data apex $V_D$, where the parallel displacement component t is defined by the three-dimensional coordinates of $V_M$ and $V_D$. On the other hand, on the basis of the direction of 2-vectors forming each apex, the rotational displacement component R is defined.

As to a combination in which the angles defined by 2-vectors forming the apex are extremely different is, since such a combination is supposed to have the lowered possibility of correct correlation, such a combination is removed from the list of the candidates. More precisely, as to $V_M(i)$, (i=1, ..., m) and $V_D(j)$, (j=1, ..., n), $$|\theta_M(i) - \theta_D(j)| < \theta$$

All the combinations P(i,j) which satisfy the preceding formula are selected as correlated candidates, then $T_{i,j}$ is calculated, where m, n are the number of apices existing in the object model and the recognition data, respectively, and 'theta' is a experimentally defined threshold value.

Next, in the step of fine adjustment, utilizing the sample points of the object model, at the same time with determining adequacy of the correlated candidates P(i,j), a necessary treatment is performed for minimizing the error included within the coordinate transforming matrix $T_{i,j}(o)$ obtained as a result of initial verification.

For each of sample points S(k), (where k=1, ..., p), of the object model, the following procedures (1) and (2) are repeated.

(1) In the two-dimensional coordinate system, to perform search of correlated points in correlation with the three-dimensional B-REP point array of the recognition data; and (2) To perform, in the three-dimensional coordinate system, updating of the coordinate transforming matrix by way of least square technique.

Here, "p" is the number of sample points, which is treated in the following steps including (1) to (7):

(1) As an image surface for searching, to prepare an image (corresponding to the left image in FIG. 4) which is plotted an image coordinates of the three-dimensional B-REP point of recognition data;

(2) To displace the sample points S(k) to S' in accordance with $T_{i,j}(o)$. As a result, the three-dimensional coordinates and unit vectors are displaced, respectively, to:

$$S'(k) = R_{i,j}(o) \, S(k) + t_{i,j}(o)$$

$$N''(k) = R_{i,j}(o) \, N'(k)$$

(3) Among S(k), those satisfy the following formula are:
[Formula 2]

$$\cos^{-1} \frac{P'(k) \cdot N'(k)}{|P'(k)|} > \frac{\pi}{2} \quad (2)$$

defined as S(k), where k=1 ......, p: S(k) represent the observable sample points after being diplaced by way of $T_{i,j}(o)$, where P'(k) is the observable direction vector with reference to S'(k), represented by:
[Formula 3]

$$P'(k) = S'(k) + t'_{i,j}(o) - C \quad (3)$$

Figure 9:
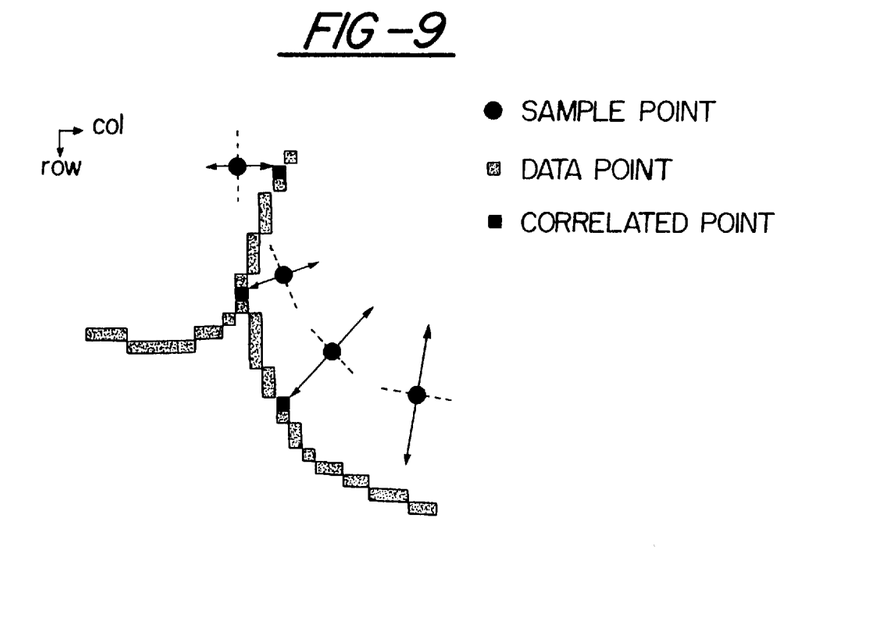
FIG. 9 is an illustrative view of searching correlated points.

Further, C is a 1×3 vector representing a observing position of a stereoscopic camera system;

(4) To project S'(k) on the image coordinates [$col_k$ $row_k$] as shown in FIG. 9, and to search the points of recognition data corresponding to sample points S(k). As shown by the arrow in FIG. 9, by tracing on the image perperndicularly to the tangential line of S(k), when the data points D(l), l=1, ..., q, are present in a predetermined distance range, such points are defined as the correlated points with reference to S(k). Here, "q" is the number of the three-dimensional B-REP points of recognition data;

(5) With reference to the combination Q(k,l) of S(k) and D(l), to calculate the transforming matrix $T_{i,j}(l')$, which is most suitable for transforming the three-dimensional coordiantes S' of S'(k) to the three-dimensional coordiantes D(l) of the correlated point D(l), by way of least square technique under the condition to minimize the value of the following formula:
[Formula 4]

$$\sum_Q |R'(k)_{ij}(l)S''(k) + t'_{ij}(l) - D'(l)|^2 \quad (4)$$

(6) To repeat the procedures (2) to (5) until the value of the following formula 5 reduces below the threshold value, under the condition of, T(r)=T'(r) T(r−1)
[Formula 5]

$$\epsilon^2 = \frac{\sum_Q \{(col_k - col_l)^2 + (row_k - row_l)^2\}}{M}$$

Here, M is the total number of Q(k,l), that is, the number of correlated points found through the searching procedure described in (4), therefore also $M_{p,q}$ may be obtained when procedures (2) to (5) are repeated, a total number of q(k,l). In addition, when the ratio M/p of the number of correlated points relative to the number of observable sample points is smaller, or the value of $e^2$ would not converge to a definite value, then the correlated candidate is deemed erroneous and is discarded; and (7) To perform the above-described treatments for all the correlated candidates P(i,j), and select the $T_{i,j}(r)$, in the case that M is maximum and the three-dimensional mean square distance, that is represented by the formula 6, becomes minimum, then such $T_{i,j}(r)$ is selected as the result of recognition:
[Formula 6]

$$e^2 = \frac{\sum_Q |R'_{ij}(r)S'(k) + t_{ij}(r) - D'(l)|^2}{M}$$

Since the initial verification mentioned above is such verification as merely using the apices which are the local structure, sometimes the search of correlated points in FIG. 9 is obtained with not so high recognition accuracy. For this reason, the fine adjustment is normally applied to the two steps of A and B as described below.

A. Initial fine adjustment: to roughly adjust the correlated error using such sample points as existing on merely two adjacent segments forming Vm(i). and B. Principal fine adjustment: to further increase the accuracy using all sample points.

Figure 10A:
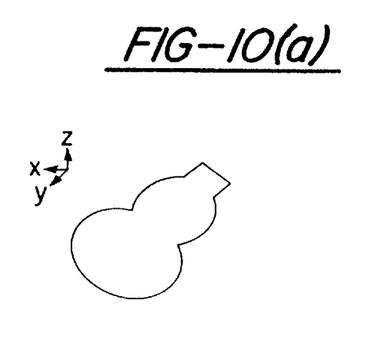
FIG. 10 is a view showing an object model and a stereoscopic image.
Figure 10B:
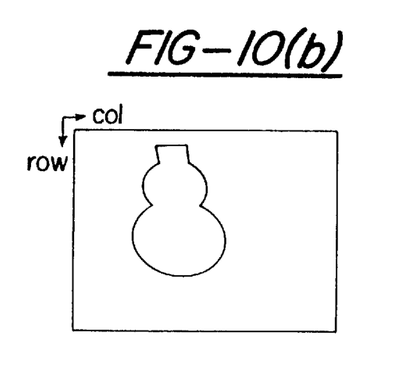

Forms in FIGS. 10(a) and (b) are the object model and entered stereoscopic image, respectively, of a flat figure (of cardboard) formed of one surface.

Figure 11A:
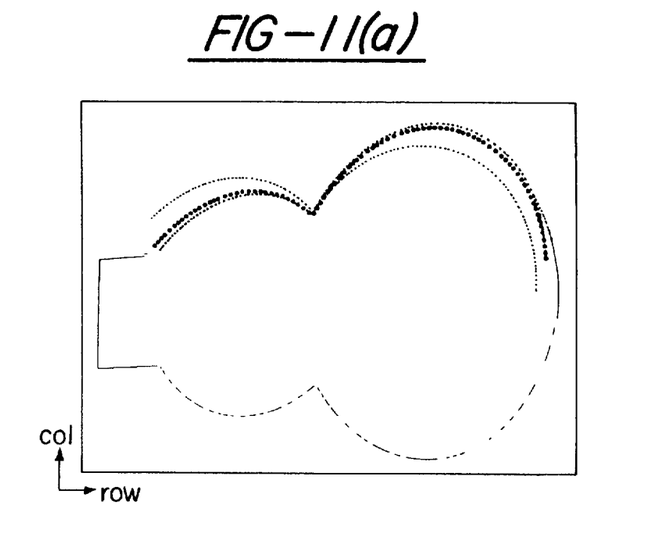
FIG. 11 is an illustrative view showing a result of fine adjustment against recognition data.
Figure 11B:
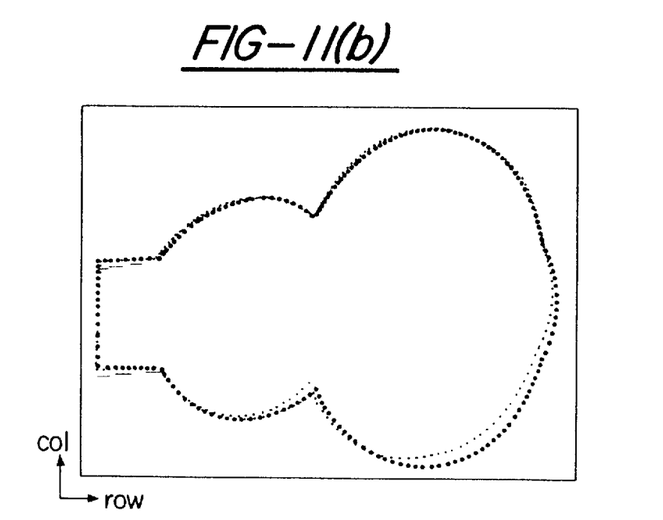

In FIG. 11(a) and FIG. 11(b), there are shown the results of initial and principal fine adjustments, respectively, according to recognition data formed from the stereoscopic image. In these drawings, there are shown sample points for which correlated points have been obtained, together with those points for which no correlated points have been obtained. In addition, the initial and principal fine adjustments are repeated for three times, and finally the correlation which have been obtained initially only adjacent the apex becomes to be obtained as to all sample points throughout the model.

Figure 3:
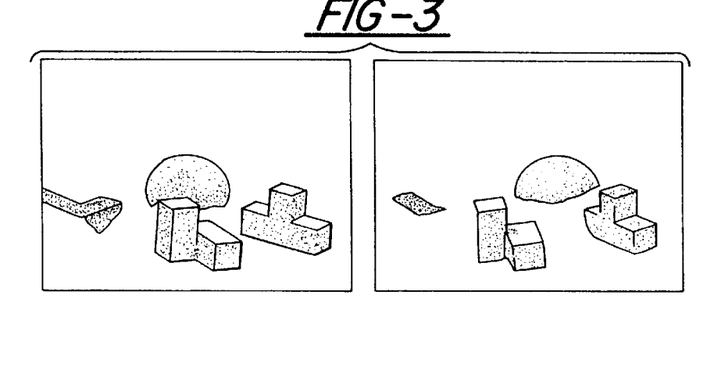
FIG. 3 is a view of a set of stereoscopic images.
Figure 12:
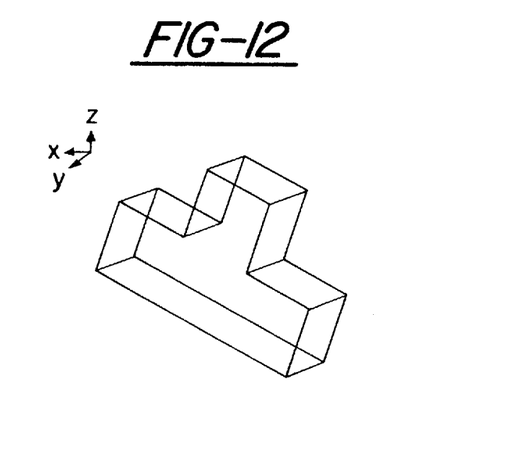
FIG. 12 is a perspective view of an object model.
Figure 13:
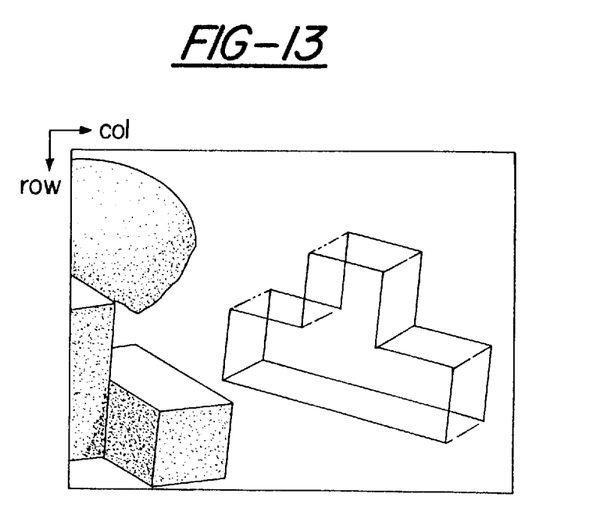
FIG. 13 is a view showing the result of the position and attitude recognition.

FIG. 12 shows an object model, and FIG. 13 shows the result of recognition in FIG. 3 according to the present embodiment.

As described above, since the searching space can be restricted by the initial verification, the high speed treatment is enabled with a simplified system, and accuracy of recognition is improved, especially by two steps of fine adjustment.

As mentioned above, the present invention provides high speed treatment and enhanced accuracy with a simplified system structure.

What is claimed is:

1. A method of processing image information by verifying an input image with an object model for determining a position and attitude of an object, comprising the steps of:

entering a stereoscopic image of an object;

extracting edges of said object from said stereoscopic image and dividing said edges into a plurality of segments;

adding apex information to said segments to produce recognition data wherein said apex information is produced through the procedures of:

(1) calculating error information by means of applying straight lines and circles to the segment to be fitted;

(2) correcting said errors by means of regressively dividing said segments into two portions and calculating error data by applying straight lines and circles to the portions;

(3) (a) combining adjacent segments which create straight lines; and
      (b) creating tangential lines by combining adjacent segments which is at the end of an arc of a segment which a circle was successfully applied; and (4) producing an apex having each vector of the tangential lines, said apex of said tangential line being allocated to the middle point of said segment being the minimum distance between the two said tangential lines;

verifying said recognition data with reference to an object model based on local geometric features to detect a corresponding candidate;

finely adjusting each of corresponding candidates on the basis of entire geometric features; and detecting said position and attitude of said object on the basis of recognition.

2. A method according to claim 1, wherein the step of said fine adjustment includes an initial fine adjustment by merely sample points on every adjacent two segments and a principal fine adjustment by all of said sample points.

\* \* \* \* \*

UNITED STATES PATENT AND TRADEMARK OFFICE
CERTIFICATE OF CORRECTION

PATENT NO. : 5,887,083
DATED : March 23, 1999
INVENTOR(S) : Yasushi Sumi, et al.

It is certified that error appears in the above-identified patent and that said Letters Patent is hereby corrected as shown below:

Column 1, line 35, delete "an".

Column 1, line 42, change "is" to --are--.

Column 1, line 42, change ", based" to --. Based--.

Column 1, line 43, change "which" to --the--.

Column 1, line 43, after "edges" insert --,--.

Column 1, line 45, delete "an".

Column 1, line 49, after "of" insert --the--.

Column 1, line 59, change "entire" to --all--.

Column 2, line 28, after "of" insert --the--.

Column 3, line 2, delete "a".

UNITED STATES PATENT AND TRADEMARK OFFICE
CERTIFICATE OF CORRECTION

PATENT NO. : 5,887,083

DATED : March 23, 1999

INVENTOR(S) : Yasushi Sumi, et al.

It is certified that error appears in the above-identified patent and that said Letters Patent is hereby corrected as shown below:

Column 3, line 6, after "adding" insert --an--.

Column 3, line 8, delete "a".

Column 3, line 20, change "is tried to fit" to --a fit is attempted--.

Column 3, line 26, move "the two" after "to".

Column 3, line 58, change "These sample points each has" to --Each of these sample points has--.

Column 4, line 36, delete "is".

Column 4, line 51, change "with" to --as--.

Column 4, line 56, after "of"(first occurrence) insert --the--.

Column 4, line 59, after "perform" insert --a--.

Column 5, line 3, change "an" to --as--.

UNITED STATES PATENT AND TRADEMARK OFFICE
CERTIFICATE OF CORRECTION

PATENT NO. : 5,887,083

DATED : March 23, 1999

INVENTOR(S) : Yasushi Sumi, et al.

It is certified that error appears in the above-identified patent and that said Letters Patent is hereby corrected as shown below:

Column 5, line 12, after "those" insert --which--.

Column 5, line 31, change "perperndicularly" to --perpendicularly--.

Column 6, line 31, change "have" to --has--.

Column 6, line 32, change "becomes" to --comes--.

Signed and Sealed this

Twenty-first Day of September, 1999

Attest:

Q. TODD DICKINSON

*Attesting Officer*    *Acting Commissioner of Patents and Trademarks*